United States Patent [19]

Hohmann

[11] Patent Number: 5,063,722
[45] Date of Patent: Nov. 12, 1991

[54] GRIPSTAY CHANNEL VENEER ANCHOR ASSEMBLY

[75] Inventor: Ronald P. Hohmann, Syosset, N.Y.

[73] Assignee: Hohmann Enterprises, Inc., Hauppauge, N.Y.

[21] Appl. No.: 331,236

[22] Filed: Mar. 31, 1989

[51] Int. Cl.⁵ .............................................. E04B 5/00
[52] U.S. Cl. ..................................... 52/410; 52/479; 52/512; 411/457
[58] Field of Search .................. 52/404, 410, 483, 508, 52/512, 479; 411/457, 458, 461, 466, 475

[56] References Cited

U.S. PATENT DOCUMENTS

| 1,504,172 | 8/1924 | Willey | 52/DIG. 6 X |
| 3,300,934 | 1/1967 | Waizenhofer | 52/404 X |
| 4,458,387 | 7/1984 | Pearson | 411/457 X |
| 4,728,237 | 3/1988 | Lorincz et al. | 411/457 X |

FOREIGN PATENT DOCUMENTS

| 0641489 | 2/1937 | Fed. Rep. of Germany | 411/458 |
| 302249 | 12/1954 | Switzerland | 52/DIG. 6 |
| 0020400 | of 1893 | United Kingdom | 411/466 |
| 1289939 | 9/1972 | United Kingdom | 411/466 |

*Primary Examiner*—David A. Scherbel
*Assistant Examiner*—Lan Mai
*Attorney, Agent, or Firm*—Lackenbach Siegel Marzullo & Aronson

[57] ABSTRACT

A gripstay channel veneer anchor assembly includes a channel member which abuttingly engages an insulation layer which in turn abuttingly engages a plurality of support members which form the inner wythe of an edifice. A clip securement member projects through apertures in the channel member, pierces the insulation member and abuttingly engages the support member. A mounting screw is provided which connects the clip securement member, the channel member and the support member to form a rigid and reliable structure.

33 Claims, 3 Drawing Sheets

GRIPSTAY CHANNEL VENEER ANCHOR ASSEMBLY

BACKGROUND OF THE INVENTION

In the design of veneer type construction systems it is of primary importance to provide a structure system which is capable of connecting the inner and outer wythes of a structure in a manner which provides complete structural integrity. This structure integrity must exist despite the possible deterioration or decay of any insulation board or other intermediate layers which are part of the assembly. It is also necessary to provide a system which can be applied in a manner which is economical of labor and which is not subject to construction errors.

OBJECTS OF THE INVENTION

It is an object of the present invention to provide a gripstay channel veneer anchoring system which is capable of retaining an insulating layer or insulating board without compromising the structural integrity of the assembly despite the damage, deterioration or destruction of the insulating layer or insulating board.

It is another object of the present invention to provide a gripstay channel veneer anchoring system which facilitates the installation of an insulating layer in a rapid labor saving manner.

It is yet another object of the present invention to provide a gripstay channel veneer anchoring system which incorporates a gasket member for prevention of damage due to seepage.

SUMMARY OF THE INVENTION

In accordance with the present invention, there is provided a gripstay channel veneer anchor system which includes a channel member, a securement clip member and a mounting bolt. The channel member has a web portion and a pair of flange portions. The web portion includes a linear array of slots and clearance holes. The securement clip member includes a base portion and a pair of arm portions which can be forced through an insulating board layer which, in turn, is disposed adjacent a support member or stud of an edifice. The base portion of the securement clip member includes a clearance hole which accepts the mounting bolt which also passes through a clearance hole in the channel. The arm portions project through the slots in the channel with the prongs piercing the insulation board and bearing on the stud of the edifice, while also urging the lips of the base portion to bear on the edges of the channel member, the assembly being positionally secured by means of the mounting bolt. The slots in the channel facilitate the securement of a wall tie thereto. The system provides for the structural connection of inner and outer wythes of an edifice which retains its integrity despite the possible damage, delay or deterioration of the insulation layer.

In an alternative embodiment of the invention, a waterproof gasket layer is interposed between the channel member and the insulation layer for the purpose of preventing damage due to seepage.

BRIEF DESCRIPTION OF THE DRAWINGS

The foregoing other objects, features and advantages of the present invention will become more apparent from the detailed description hereinafter when considered in conjunction with the drawings wherein:

FIG. 4 is a perspective view of an alternative securement clip member shown removed from the gripstay channel veneer anchoring system of FIG. 1.

DETAILED DESCRIPTION OF THE PREFERRED EMBODIMENTS

Figure 1:
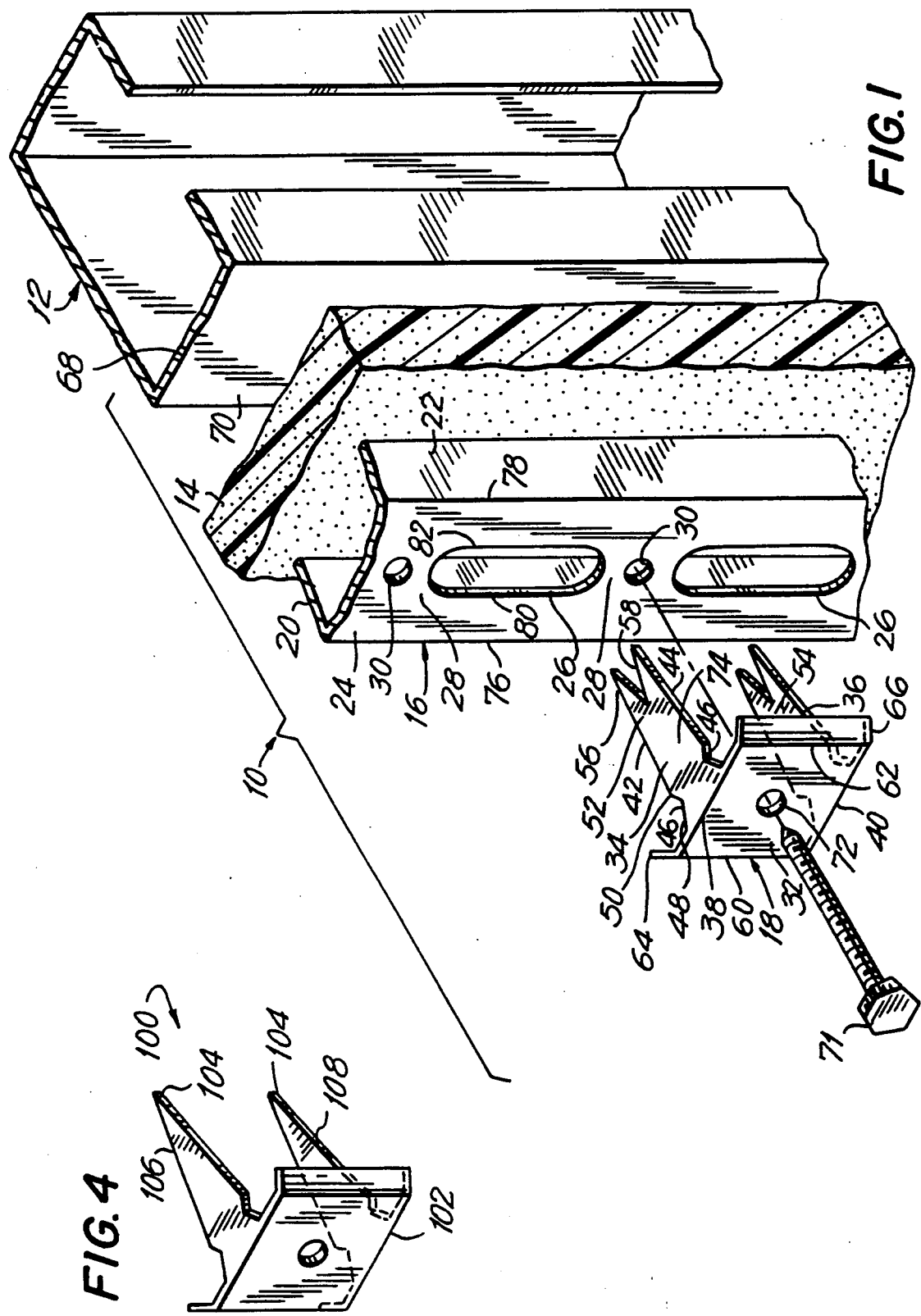
FIG. 1 is an overall exploded perspective view of a gripstay channel veneer anchor system fabricated in accordance with the principles of the present invention and with the system shown in use.

Referring now to the drawings, and more particularly to FIG. 1, there is depicted a new and novel gripstay channel veneer anchoring system generally denoted by the reference numeral 10 and fabricated in accordance with the principles of the present invention.

The system 10 according to the present invention is used in conjunction with drywall construction systems which include an outer wythe (not shown), an inner wythe which comprises a plurality of support members one of which is illustrated typically in FIG. 1 as the stud 12, and an insulation layer or insulation board 14.

The system 10 comprises a channel member 16, a clip securement member 18 and a mounting screw 71.

Figure 2:
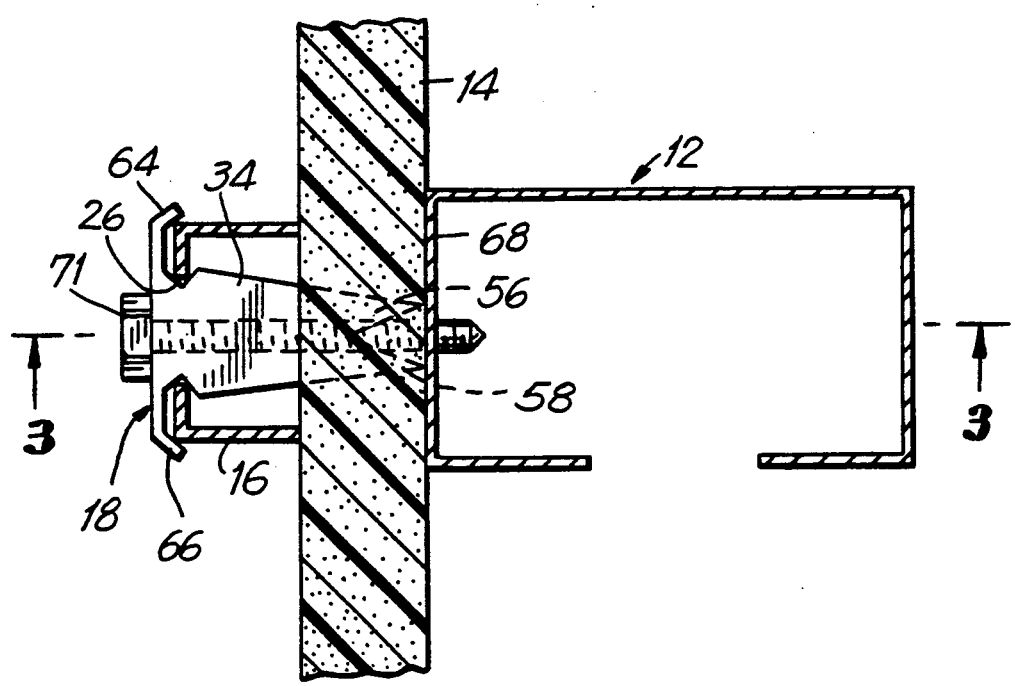
FIG. 2 is a top view of the system of FIG. 1 in its completed configuration.
Figure 3:
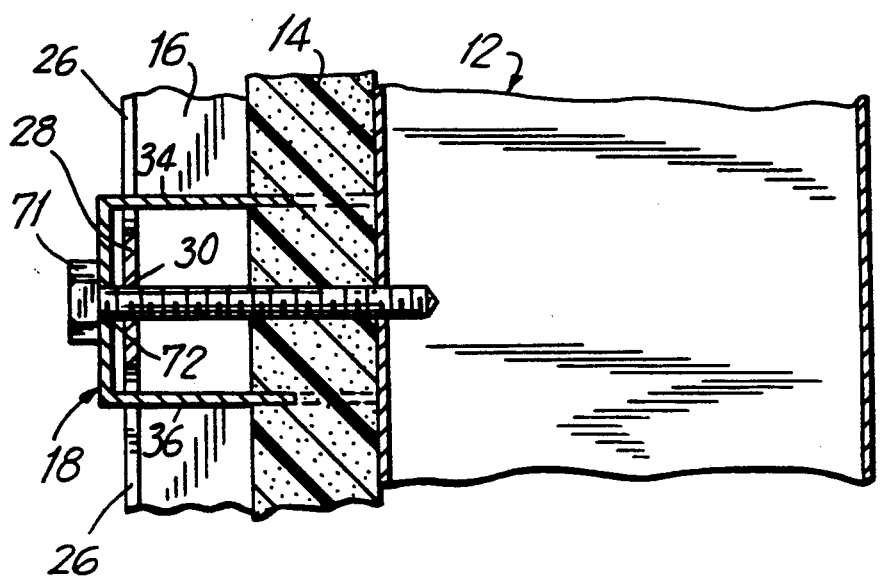
FIG. 3 is a cross-sectional view taken along the line 2—2 of FIG. 2.

The channel member is disposed adjacent to the insulating board 14. The channel member 16 includes a pair of flange portions 20, 22 and a web portion 24. The outer ends of the flange portions 20, 22 are placed in contact with the insulating board 14, as best shown in FIGS. 1 and 2.

The web portion 24 includes a linear array of slots 26 with the web portions 28 between adjacent slots 26 each having a mounting hole 30. The slots 26 in the channel member 16 serve a dual function. The slots 26 cooperate with the clip securement member 18 for attachment of the channel member 16 with respect to the stud 12 in a manner which will be described presently. Additionally, the slots 26 also facilitate the attachment of wall anchors or wall ties to the channel member 16 in a manner which is not shown, but which is obvious to those skilled in the art associated with the present invention. The wall ties serve to interconnect the inner and outer wythes of the structure.

The securement clip member 18 includes a base portion 32 and a pair of arm portions 34, 36 which project, respectively, from upper and lower edges 38, 40 of the base portion 32. The arm portions, 34, 36, are generally perpendicular to the base portion 32 and each includes inwardly tapered edges 42, 44, with the wider part of the arm portions 34, 36 being disposed adjacent to the base portion 32. Adjacent to the base portion 32 each of the arm portions 34, 36 include notch portions 46 which are formed by an inwardly tapered edge portion 48 and an outwardly tapered edge portion 50. The outer ends 52, 54 of the arm portions, 34, 36 each terminate in a pair of prongs or bifurcations 56, 58.

Lateral edges 60, 62 of the base portion 32 include lip portions 64, 66 which are angularly formed with respect thereto. The lip portions 64, 66 cooperate with the notch portion 46 and the channel member 16 to provide a major novel feature of the present invention.

In use, the system 10 is assembled by first postionally disposing the insulating board 14 in abutting adjacent relationship with the flange 68 of the stud 12 of an edifice. The flanges 20, 22 of the channel member 16 are then disposed in abutting adjacent engagement with the insulating board 14 and in general alignment with the front flange 68 of the stud 12. The arm portions 34, 36 of the clip securement member 18 are introduced into vertically adjacent ends of the slots 26 of the channel member 16. The base 32 of the clip securement member 18 is then urged toward the stud 12, whereby the prongs 56, 58 at the outer ends 52, 54 of the arm portions 34, 36 pierce the insulation board 14 and ultimately come into contact with the front surface 70 of the flange 68, as shown in FIG. 2.

A mounting screw 71, preferably of the self-tapping type, passes through a hole 72 in the base portion 32, the hole 30 in the channel 16 and ultimately the flange 68.

As best seen in FIG. 2, the arm portions 34, 36 and the lip portions 64, 66 of the clip securement member 18 are proportioned such that when the prongs 56, 58 are in contact with the flange 68 of the stud member 12, the wider portions 74 of the arm portions 34, 36 have been forced through the slots 26 in the channel 16 and the lip portions 64, 66 are in contact with the edges 76, 78 of channel member 16. The two point contact of the prongs 56, 58 combined with the centrally located mounting screw 70 provides a rigid structural connection.

The structural integrity of the system 10 remains intact even should there be deterioration, damage or decay of the insulation board 14. Potential movement of the channel 16 towards the stud 12 is prevented by means of the engagement of edges 80, 82 of the slots 26 being within the notches 46 formed in the arm portions 34, 36; and the prongs 56, 58 at the ends of the arm portions 34, 36 bearing on the flange portion 68 of the stud 12. Also, movement of the channel 16 in a direction away from the stud 12 is prevented by means of the mounting screw 71. Potential movement of the channel 16 in a lateral direction; i.e., in a direction which is parallel to the flange 68 of the stud 12, or rotational about the axis of screw 70, is prevented by the engagement of lip portions 64, 66 of the clip securement member 18 with the edges 76, 78 of the channel 16. The channel 16 is thus rigidly attached with respect to the stud 12, notwithstanding any possible subsequent deterioration, damage or decay of the insulating board 14.

An alternative embodiment of the invention 100 is depicted in FIG. 4. In this embodiment, the clip securement member 18 of FIGS. 1-3 and 5 is replaced by the clip securement member 102. The clip securement member 102 of FIG. 4 is generally similar to that of clip securement member 18, except that a single point prong 104 is formed at the end of each of the arms, 106, 108. The operation of the clip securement member 102 is substantially the same as that of the operation of the clip securement member 18.

Figure 5:
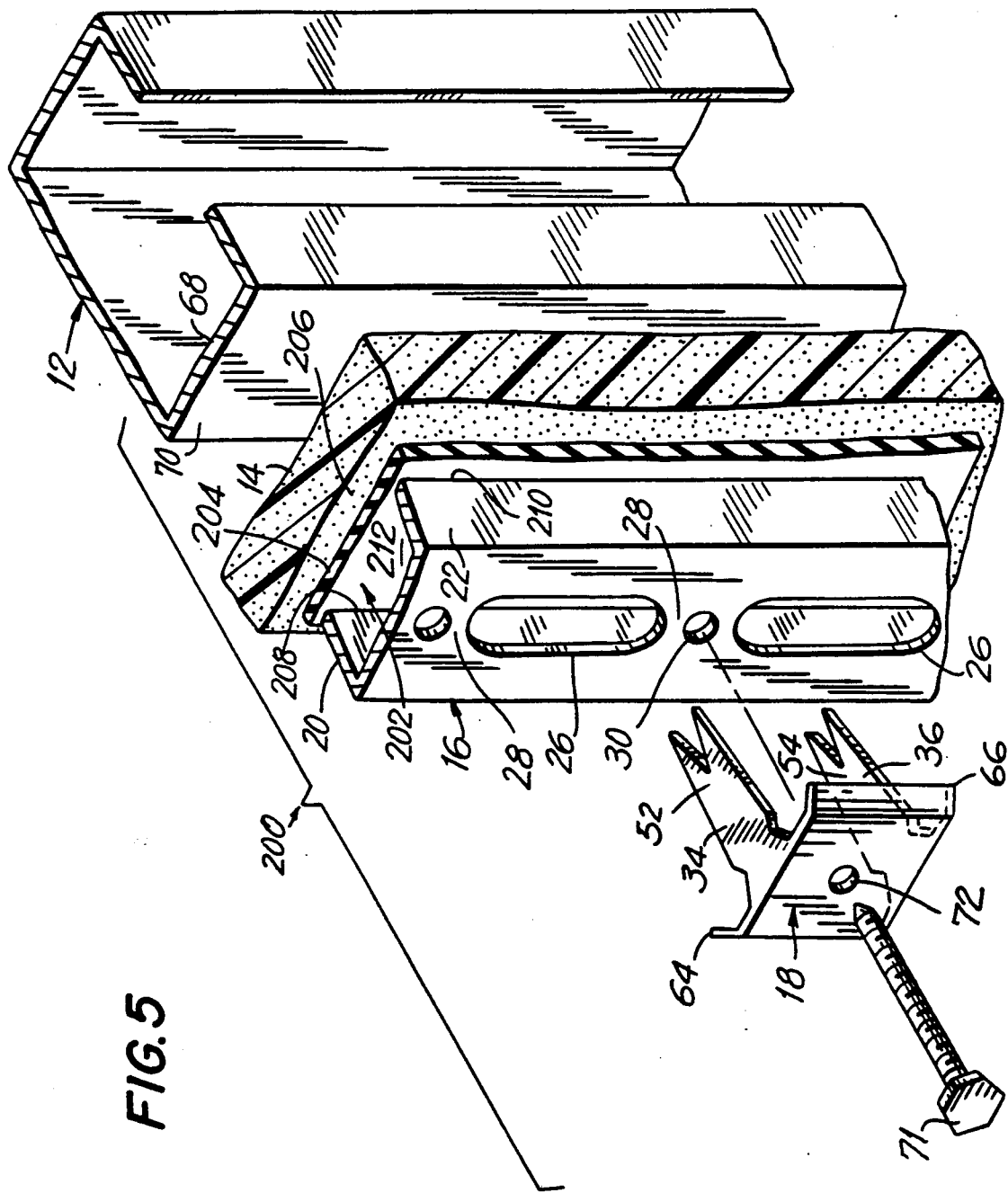
FIG. 5 is a perspective view of an alternative embodiment of the gripstay channel veneer anchoring system depicted in FIG. 1.

Another alternative embodiment of the invention denoted 200 is shown in FIG. 5 and includes an insulation board 14, a channel member 16 and a clip securement member 18, all of which are identical to corresponding elements of the primary embodiment of the invention 10 shown in FIG. 1. A continuous rubber gasket strip 202, which includes an adhesive layer 204, is adhered to the surface 206 of the insulation board 14.

The gasket strip 202 is disposed in general alignment with the flange 68 of the stud 12 and the outer edges 208, 210 of the flanges 20, 22 of the channel member 16 bear against the surface 212 of the gasket strip 202. The gasket strip 202 thereby tends to prevent deterioration or damage to the insulating board 14 due to water seepage around and through the channel member 16.

It will thus be apparent to those skilled in the art that the present invention provides new and novel veneer anchor constructions and new and novel dry wall construction systems which are capable of easy and direct fabrication by those skilled in the art.

While I have shown and described the preferred embodiments of the present invention, it will be readily apparent to those skilled in the art that there are many changes, modifications and improvements which may be made therein without departing from the spirit and scope of the invention as hereinabove described and envisioned and as hereinafter claimed.

What is claimed is:

1. A veneer anchor assembly for use in the interconnection of an inner wythe and an outer wythe of an edifice, wherein said inner wythe comprises a plurality of support members forming the frame of the edifice,
    said veneer anchor asembly comprising a vertically extending channel member, and a securement clip member,
    said channel member comprising a pair of spaced apart flange portions, and a web portion,
    said web portion being connected between the side edges of said flange portions,
    said web portion including a plurality of apertures formed therein,
    said securement clip member comprising a base portion, and a pair of arm members,
    each of said arm members including locking means,
    said arm members projecting into said apertures of said channel member in a manner whereby said locking means lockingly engage said securement clip member with respect to said channel member, and
    securing means connected to said securement clip member and said channel member for securement of said members to one of said support members and thus to said inner wythe.

2. A veneer anchor assembly in accordance with claim 1, including
    an insulation layer disposed between said support member and said channel member, and
    said flange portions being disposed in abutting engagement with said insulating layer.

3. A veneer anchor assembly in accordance with claim 2, comprising
    insulation piercing means formed on the outer ends of each of said arm members.

4. A veneer anchor assembly in accordance with claim 3, wherein
    said insulation piercing means comprises at least one prong formed on each of said arm members.

5. A veneer anchor assembly in accordance with claim 3, wherein
    said insulation piercing means comprises a bifurcation forming a pair of prongs on the outer ends of each of said arm members.

6. A veneer anchor assembly in accordance with claim 1, wherein
    said locking means comprises at least one notch formed on each of said arm members, and said notch engaging said web portion of said channel member.

7. A veneer anchor asembly in accordance with claim 1, wherein
said locking means comprises a pair of inwardly directed notches formed on each of said arm members, and
each of said notches engaging said web portion of said channel member.

8. A veneer anchor assembly in accordance with claim 1, wherein
said web portion includes a linear array of predeterminedly spaced slots.

9. A veneer anchor assembly in accordance with claim 8, wherein
each of said slots is of generally oblong configuration.

10. A veneer anchor assembly in accordance with claim 8, wherein
said web portion includes a linear array of holes interposed between adjacent ones of said spaced apart slots.

11. A veneer anchor assembly in accordance with claim 10, wherein
said base portion of said securement clip member has a bore formed therein,
said securing means comprises a threaded bolt, and
said threaded bolt extends through said bore in said base portion, one of the holes in the web portion of said channel member and threadly engages said one of said support members, thereby fixedly positionally securing said veneer anchor assembly with respect to said inner wythe.

12. A veneer anchor assembly in accordance with claim 1, wherein
said flange portions are disposed in substantially perpendicular relationship to said web portion.

13. A veneer anchor assembly in accordance with claim 1, wherein
said arm members project perpendicularly from said base portion of said securement clip member.

14. A veneer anchor assembly in accordance with claim 1, wherein
said base portion further comprises a pair of lip portions connected to the ends thereof.

15. A veneer anchor assembly in accordance with claim 14, wherein
said lip portions are angularly disposed with respect to said base portion.

16. A veneer anchor assembly in accordance with claim 15, wherein
said lip portions are adapted to be disposed in bearing engagement against respective edges of said flange portions.

17. A veneer anchor assembly in accordance with claim 1, wherein
the outer ends of said arm members are disposed in bearing engagement with said support member of said inner wythe.

18. A veneer anchor assembly system comprising a plurality of support members forming the frame of an edifice,
an insulation layer disposed in abutting engagement with the outer surface of selected ones of said support members,
at least one channel member having a pair of flange portions and a web portion,
said flange portions having the edges thereof disposed in abutting engagement with the outer surface portion of said insulation layer,
said web portion having a plurality of apertures formed therein,
at least one clip securement member comprising
a base portion, and
a pair of arm portions projecting from said base portion,
said arm portions projecting through selected apertures in said web portion,
said arm portions including piercing means on the outer ends thereof capable of piercingly penetrating said insulation layer,
said piercing means being disposed in abutting engagement with said outer surface of a selected one of said support members, thereby spacing said base portion a predetermined distance from said support member,
said base portion being disposed in abutting engagement with said web portion of said channel member, and
connection means interconnected between said clip securement member, said channel member and said support member for positionally securing said clip securement member and said channel member with respect to said support member, thereby preventing any undesirable movement between said clip securement member, said channel member and said support member.

19. A veneer anchor system in accordance with claim 18, wherein
said insulation piercing means comprises a prong formed on the outer end of each of said arm portions.

20. A veneer anchor system in accordance with claim 18, wherein
said insulation piercing means comprises a pair of prongs formed on the outer end of each of said arm portions.

21. A veneer anchor system in accordance with claim 18, comprising locking means disposed on said clip securement members,
said locking means comprising at least one notch formed on each of said arm positions and adapted for engaging the web portion of said channel member.

22. A veneer anchor system in accordance with claim 21, wherein
said locking means comprises a pair of oppositely directed notches formed on each of said arm portions engaging said web portion of said channel member.

23. A veneer anchor system in accordance with claim 18, wherein
said web portion includes a linear array of slots.

24. A veneer anchor system in accordance with claim 23, wherein
each of said slots is of substantially oblong configuration.

25. A veneer anchor system in accordance with claim 23, wherein
said web portion includes a linear array of mounting holes interposed between adjacent ones of said slots.

26. A veneer anchor system according to claim 18, wherein said flange portions are generally perpendicular to said web portion.

27. A veneer anchor system in accordance with claim 18, wherein
said arm portions project perpendicularly from said base portion.

28. A veneer anchor system in accordance with claim 18, wherein
said base portion further comprises a pair of lip portions extending therefrom.

29. A veneer anchor system according to claim 28, wherein
said lip portions are angularly disposed with respect to said base portion.

30. A veneer anchor system according to claim 28, wherein
said lip portions are each disposed in bearing engagement against respective edges of said web portion secured to said flange portions.

31. A veneer anchor assembly system comprising a plurality of support members forming the frame of an edifice,
an insulation layer disposed in abutting engagement with the outer surface of selected ones of said support members,
a gasket layer disposed in abutting engagement with the outer surface of said insulating layer,
at least one channel member having a pair of flange portions and a web portion,
said flange portions having the edges thereof disposed in abutting engagement with the outer surface portion of said gasket layer,
said web portion having a plurality of apertures formed therein,
at least one clip securement member comprising
a base portion, and
a pair of arm portions projecting from said base portion,
said arm portions projecting through selected apertures in said web portion,
said arm portions including piercing means on the outer ends thereof capable of piercingly penetrating said gasket and insulation layers,
said piercing means being disposed in abutting engagement with said outer surface of a selected one of said support members, thereby spacing said base portion a predetermined distance from said support member,
said base portion being disposed in abutting engagement with said web portion of said channel member, and
connection means interconnected between said clip securement member, said channel member and said support member for positionally securing said clip securement member and said channel member with respect to said support member, thereby preventing any undesirable movement between said clip securement member, said channel member and said support member.

32. A veneer anchor assembly in accordance with claim 31, wherein
said gasket layer comprises a member having nonconformal dimensions with that of said insulating layer.

33. A veneer anchor assembly in accordance with claim 32, wherein
said gasket member is fabricated from a rubber-like material.

* * * * *